United States Patent Office 3,259,668
Patented July 5, 1966

3,259,668
PREPARATION OF SYNTHETIC
LUBRICATING OIL
Donald H. Antonsen, Glen Mills, Pa., assignor to Sun Oil Company, Philadelphia, Pa., a corporation of New Jersey
No Drawing. Filed Jan. 13, 1964, Ser. No. 337,136
17 Claims. (Cl. 260—683.15)

This invention relates to the preparation of synthetic lubricating oils having unusually high viscosity indexes and low pour points by the polymerization of certain straight chain alpha olefins by means of a particular type of catalyst system.

There are various special applications for lubricating oils in which it is highly desirable that the oil employed have an especially high viscosity index, for example, a V.I. above 130. The oil also should have a low pour point, e.g., below $-30°$ F., high oxidation stability and lubricating properties that provide good wear characteristics. One such application is in the lubrication of jet aircraft wherein conditions of both low and high temperature may be encountered. Other special applications in which lubricants having such characteristics are desirable are automatic transmission lubrication, high temperature hydraulic applications and brake fluids. Lubricating oils that can be derived from petroleum generally do not have the combination of properties desired for these special applications.

Lubricating oils having viscosity indexes considerably higher than for those normally derived from petroleum have been prepared heretofore by the polymerization of various olefins. In the prior art several catalyst systems have been disclosed for effecting this reaction to produce oily polymers. Aluminum chloride is one of the catalysts that has been used for this purpose (Montgomery et al. United States Patent No. 2,559,984). This catalyst promotes reaction by a cationic type of mechanism, and accordingly it not only affects polymerization of the olefin but also causes isomerization of both the olefin monomer before polymerization and the polymerization product. This is disadvantageous, since the polymer products obtained in systems where isomerization occurs have lower viscosity indexes than would result in the absence of isomerization.

Garwood United States Patent No. 2,937,129 discloses the use of another type of catalyst system for producing polymeric lubricating oils, namely, ditertiary alkyl peroxides. This type of catalyst, which is used at a temperature of the order of 150° C., promotes reactions by a free radical mechanism and it also has the disadvantage of causing isomerization as well as polymerization to occur.

The polymerization of ethylene to oils by utilizing a combination of $TiCl_4$ and an aluminum alkyl halide such as aluminum ethyl sesquichloride has been described in White et al. United States Patent No. 2,993,942. This type of catalyst system contains both anionic and cationic components, and with higher olefins it also will cause isomerization of the olefin monomer and polymer product to occur. With ethylene as the starting olefin, isomerization of the monomer of course cannot take place but the polymer product has such a high pour point that it generally is not a suitable lubricant for the special types of applications referred to above.

The present invention is directed to the preparation of synthetic lubricating oils by the polymerization of alpha olefins utilizing a catalyst system which minimizes isomerization reactions and provides other benefits over catalyst systems heretofore used. The starting olefin can be any straight chain alpha olefin of the $C_6$–$C_{14}$ range or mixtures thereof. The total oil product boiling above 650° F. that is produced by the reaction generally has a viscosity index above 130 and a pour point substantially below $-30°$ F. Distillate fractions obtained therefrom have outstandingly good low temperature characteristics, exhibiting viscosities at $-65°$ F. which are considerably below values predicted by extrapolation from the viscosities measured at 100° and 210° F. The product, after hydrogenation to saturate double bonds in the polymer, has excellent oxidation stability and provides good wear characteristics in lubricating applications. The invention can be utilized to make products ranging widely in viscosity and having numerous specialty applications.

The invention has particular utility in the manufacture of synthetic oils for use in formulating jet aircraft lubricants such as those conforming to U.S. Military Specification MIL–L–7808E (March 13, 1963). This specification includes the following property requirements: visc. @ 210° F.=3.0 cs. (min.); visc. @ 100° F.=11.0 cs. (min.); flash point=400° F. (min.); pour point=$-75°$ F. (max.); and visc. @ $-65°$ F.=$<13,000$ cs. The last-mentioned requirement with respect to viscosity at $-65°$ F. is particularly difficult to meet and polyolefin oils generally fail this requirement. Oils can be produced by the present process, however, which meet this low temperature requirement. It is typical of the present products that their actual viscosities at $-65°$ F. are considerably lower than would be expected from their viscosities at 100° and 210° F.

According to the invention, synthetic lubricating oils are prepared by contacting one or more alpha olefins of the $C_6$–$C_{14}$ range at a temperature in the range of 0–50° C. with a catalyst system formed from the following three types of components:

(1) Aluminum alkyl sesquichloride,
(2) Titanium tetrachloride, and
(3) An oxide of a tertiary amine or of an aromatic amine.

The amine oxide component of the catalyst system can be any tertiary amine oxide or any aromatic amine oxide. Compounds of this type are known and can be prepared by oxidizing either tertiary or aromatic amines with a suitable oxidizing agent such as hydrogen peroxide. See, for example, Fieser and Fieser, "Advanced Organic Chemistry," pages 513–514 (1962)). The term "tertiary amine" as used herein refers to amines in which the nitrogen atom is attached through its three valences to three separate carbon atoms which can be carbon atoms of the same or different hydrocarbon groups that can be alkyl, alkenyl, alkynyl, aryl, alkaryl or aralkyl. The oxides of such amines are represented by the formula

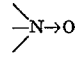

wherein each valence connects the nitrogen with a different carbon atom and the oxygen is joined to the nitrogen by a coordinate covalent link. The three valence bonds can attach the nitrogen atom to form one to three separate hydrocarbo groups which can be of the same or different types, i.e., alkyl, aryl, etc. In cases where the tertiary amine oxide has less than three hydrocarbo groups, either two or three of the carbon atoms attached to the nitrogen participate therewith in a ring structure. An example of a tertiary amine for which the oxide would have only one hydrocarbo group is quinuclidine which has the structure

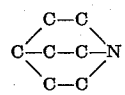

The following are specific examples of other tertiary amines corresponding to the oxides employed in the present invention: trimethylamine; triethylamine; triisobutylamine; tridecylamine; trilaurylamine; methyldipropylamine; dimethylcyclohexylamine; tricyclopentylamine, triphenylamine phenyldimethylamine; tribenzylamine; dimethylcyclooctylamine; N-methylpiperidine; N-ethylpyrrolidine; and the like.

In place of the tertiary amine oxides discussed above the present catalyst system can be prepared employing the oxides of aromatic amines. The term "aromatic amine" as used herein refers to amines in which the nitrogen atom is a member of an aromatic ring and thus is attached to only two carbon atoms. The amine oxides of this type are represented by the formula

wherein the nitrogen-containing ring may be attached to other hydrocarbon groups which can be either aromatic or non-aromatic or the ring can be part of a fused ring system. Examples of aromatic amines corresponding to the oxides of this class are as follows: pyridine; alpha-, beta- or gamma-picoline; quinoline; isoquinoline; quinaldine; lepidine; and acridine.

The aluminum-containing component of the catalyst system must be a sesquichloride, as the desired results cannot be obtained with either an aluminum dialkyl monochloride or an aluminum alkyl dichloride. The alkyl group in the sesquichloride can contain from one to ten carbon atoms and preferably is a straight chain alkyl group. The sesquichloride can contain branched chain alkyl groups such as isobutyl or isopentyl, although this is not preferred. Examples of suitable alkyl groups in the sesquichloride are methyl, ethyl, propyl, n-butyl, n-hexyl, n-octyl and n-decyl.

It is highly important for obtaining the best products in good yield that the three components of the catalyst system be present in certain proportions. In the first place the aluminum compound and the titanium tetrachloride should be used in amounts such that the atomic ratio of Al to Ti is in the range of 0.5–2.5 and more preferably 1.0–1.6. At Al:Ti rations below 0.5 the desired viscosity-temperature characteristics of the product cannot be secured, while at ratios above 2.5 the viscosity-temperature characteristics for the oils are poorer and also there is a tendency to produce solid polymers. Secondly, it is highly important that the amount of amine oxide employed in the catalyst system be such that the atomic ratio of O to Al is within a certain narrow range. This range is 0.2:1 to 0.6:1, and the preferred range is 0.3–0.55. At O to Al ratios below 0.2:1 lower yields of product are obtained and poorer viscosity-temperature characteristics of the product result. An increase of the ratio above 0.6 causes a sharp drop in the yield of product. Increasing the O to Al ratio within the specified range generally does not have any large effect upon the average viscosity of the polymer oil produced.

The polymerization reaction can be carried out either with or without a solvent being employed. When no solvent is used, the olefin charge itself functions as the reaction medium and the catalyst is prepared in situ by adding the three above-specified catalyst components to the olefin monomer. In the absence of a solvent there is a tendency for the catalyst to degradate more rapidly and its rate of deterioration depends upon its concentration; hence the olefin to $TiCl_4$ weight ratio preferably should be in excess of 100:1. Alternatively the reaction can be carried out in the presence of a solvent which can be a saturated hydrocarbon or certain types of halohydrocarbons, in which case olefin to $TiCl_4$ ratios below 100:1 can be used if desired without undue degradation of the catalyst occurring. When a saturated hydrocarbon solvent is used, the properties of the polymer oils obtained are substantially the same as when no solvent is employed. On the other hand the use of a halohydrocarbon solvent tends to shift the product molecular weight downwardly and give oils of lower viscosity.

When a saturated hydrocarbon solvent is used, it can be a paraffinic hydrocarbon, including both n-paraffins and isoparaffins, or a naphthenic hydrocarbon or mixtures thereof. Examples of suitable hydrocarbon solvents are n-pentane, isopentane, hexanes, octanes, decanes, cyclohexane, methylcyclopentane, dimethylcyclohexane and the like. An aromatic hydrocarbon, such as benzene or toluene, should not be used since it causes the formation of too much dimer which boils below the lubricating oil range desired. Also with an aromatic hydrocarbon solvent, there is a tendency to obtain alkylation of the aromatic if even small amounts of water happen to be present in the system.

The types of halohydrocarbons that are suitable as the reaction medium are halobenzenes having 1–2 halogen atoms, trihaloethanes, tetrahaloethanes, trihaloethylenes and tetrahaloethylenes, in which halohydrocarbons the halogen can be either chorine or fluorine or both. Particularly suitable solvents are the monohalobenzenes, viz., chlorobenzene and fluorobenzene, and dihalobenzenes which are liquid at the reaction temperature such as ortho- and meta-dichlorobenzenes or difluorobenzenes, since with such solvents considerably higher yields of polymer lubricating oil per gram of $TiCl_4$ used are often obtainable than when a saturated hydrocarbon reaction medium is employed. Examples of other halohydrocarbons that can be used are: methyl chloroform; 1,1,2-trichloroethane; 1,1,2,2-tetrachloroethane; trifluoroethanes; chlorodifluoroethanes; tetrafluoroethane; and similar ethylene derivatives containing 3–4 halogen atoms which are chlorine and/or fluorine. In using a solvent the weight ratio thereof to olefin monomer generally is in the range of 1:2 to 4:1.

The weight proportion of olefin charge to titanium tetrachloride used in the reaction mixture can vary widely, ranging for example from 25:1 to 1000:1 depending largely upon the purity of the olefin charge. When highly purified olefin monomer is used, 60–75% of the olefin typically can be converted to higher boiling products at olefin to $TiCl_4$ ratios up to 500:1 either in the presence or absence of a solvent.

The temperature for carrying out the reaction is in the range of 0–50° C. With a saturated hydrocarbon solvent a temperature of 10–30° C. preferably is used, while with a halohydrocarbon solvent the preferred temperature is 25–40° C. The molecular weight of the product tends to increase with increasing reaction temperature. At temperatures below 0° C. substantially no reaction is obtained, while at temperatures above 50° C. the viscosity of the product becomes extremely high and also the catalyst becomes considerably less active.

After the polymerization reaction has been completed, the catalyst can be deactivated and its residues removed in any conventional or suitable manner and the reaction mixture can be fractionated to recover the reaction medium and unreacted monomer. The polymer product can then be distilled to separate synthetic oils of boiling ranges as desired. The snythetic oils obtained preferably are hydrogenated in known manner prior to use in lubricating applications. Typical conditions for liquid phase hydrogenation using a Raney nickel catalyst comprise temperatures in the range of 150–250° C. and a hydrogen pressure in the range of 1000–2500 p.s.i.g. The resulting hydrogenated products have outstanding oxidation stabilities and lubricating characteristics.

The following examples illustrate the invention more specifically:

EXAMPLE I

A series of four runs was made to determine the effect of 4-picoline-1-oxide as a catalyst component in the polymerization of n-octene-1. Each run was carried out in a stirred reactor which had been carefully cleaned and dried beforehand. No solvent was used and the conditions for all runs were the same except that the amount of the amine oxide was varied such that the O/Al atomic ratio ranged from zero to 0.7. In all runs the weight proportion of octene-1 to TiCl₄ was 300:1. Each run was made using aluminum ethyl sesquichloride and TiCl₄ in amounts corresponding to an Al:Ti atomic ratio of 1.25, and reactions were carried out at 30° C. for 20 hours. The catalyst was then deactivated by adding to the reaction mixture 20 g. of Na₂CO₃, adding 25 ml. of water with thorough mixing and then filtering. The filtrate was distilled to recover unpolymerized octene and to remove from the polymer the dimer fraction which boiled below 650° F. In all runs the total oil boiling above 650° F. had a pour point in the neighborhood of —75° F. Product yields and viscosity properties are shown in Table 1.

Table 1

| Run No. | O:Al Ratio | Percent Conversion of Octene-1 | Weight Percent Dimer in Product | Total Oil Above 650° F. | | |
|---|---|---|---|---|---|---|
| | | | | K.V. @ 100° F., cs. | K.V. @ 210° F., cs. | V.I. |
| 1 | 0.0 | 56.0 | 14.9 | 45.5 | 8.04 | 141 |
| 2 | 0.3 | 68.8 | 16.2 | 31.1 | 60.5 | 146 |
| 3 | 0.5 | 74.0 | 20.8 | 31.1 | 6.00 | 148 |
| 4 | 0.7 | 10.4 | 37.5 | 14.5 | 3.50 | 138 |

The valves listed for percent conversion show that a distinct increase in yield was obtained by incorporating picoline oxide in the catalyst, that the yield reached a maximum as the O:Al ratio increased and that it had decreased sharply when the O:Al ratio reached 0.7. The percent of product which was dimer also increased substantially as the O:Al ratio reached 0.7. While not specifically shown by the data in Table 1, the product from Run No. 1 is not suitable for preparing jet aircraft lubricant conforming to Specification MIL-L-7808E because the low temperature viscosity requirements cannot be met whereas the products from Run Nos. 2 and 3 can be used for this purpose.

EXAMPLE II

The polymer oil obtained from Run No. 3 was vacuum distilled to obtain distillate and residue fractions as shown in Table 2. The table also shows viscosity characteristics of the fractions, including viscosities as measured at —65° F. compared with the values obtained by extrapolation from the viscosities at 100° and 210° F.

Table 2

| Fraction (Cut points @ atmos. press.) | Percent of Dimer-free Polymer | K.V. @ 100° F., cs. | K.V. @ 210° F., cs. | V.I. | K.V. @ —65° F. | |
|---|---|---|---|---|---|---|
| | | | | | Measured | Extrapolated |
| Trimer (650–715° F.) | 28.8 | 8.00 | 2.34 | 121 | 1,750 | 4,000 |
| Tetramer (755–850° F.) | 21.2 | 18.49 | 4.00 | 134 | 12,598 | 31,000 |
| Pentamer (850–1,000° F.) | 6.6 | 23.44 | 4.66 | 132 | 20,990 | 60,500 |
| Hexamer+(1,000–1,150° F.) | 22.8 | 44.46 | 7.26 | 129 | | |
| Residue | 60.6 | 323.4 | 34.1 | 126 | | |

The comparison shows that the actual viscosities at —65° F. are considerably less than the values that would be expected from a projection of the viscosity-temperature curve based on the 100° and 210° F. data. This circumstance is important in utilizing the invention for the manufacture of jet aircraft lubricants meeting the requirements of Specification MIL-L-7808E.

EXAMPLE III

A run (No. 6) was made in which n-octene-1 was polymerized using as catalyst a combination of TiCl₄, aluminum ethyl sesquichloride and pyridine oxide, the ratio of O:Al being 0.5. A control run (No. 5) was made under the same conditions except that no pyridine oxide was used. In each run n-hexane was added as solvent in amount of 0.43 volume per volume of octene-1, the TiCl₄ and aluminum compound were used in amounts such that the Al:Ti atomic ratio was 1.25, the weight ratio of octene-1 to TiCl₄ was 100:1 and the reaction was carried out at 30° C. for 20 hours. Results are shown in Table 3.

Table 3

| Run No. | O:Al Ratio | Percent Conversion of Octene-1 | Wt. Percent Dimer in Product | Total Oil Above 650° F. | | |
|---|---|---|---|---|---|---|
| | | | | K.V. @ 100° F., cs. | K.V. @ 210° F., cs. | V.I. |
| 5 | 0.0 | 76.0 | 13.2 | 45.7 | 8.40 | 145 |
| 6 | 0.5 | 82.9 | 17.0 | 53.3 | 9.43 | 144 |

The data for percent conversion again show an increase in product yield as the amine oxide is incorporated in the catalyst, although the increase in this case is not large due to the fact that the concentration of catalyst used in these comparative runs was relatively high. Low temperature jet aircraft specifications could not be met using the product from the control run (No. 5) but could be employing the product from Run No. 6.

EXAMPLE IV

By way of comparison, when Run No. 2 was repeated except that diethyl aluminum chloride was substituted for aluminum ethyl sesquichloride, the conversion was only 52.7% as compared to 68.8% in Run No. 2. This indicates that the use of an amine oxide does not provide any benefit when a dialkyl aluminum monochloride is employed in preparing the catalyst system.

When other amine oxides as herein specified are substituted for picoline oxide or pyridine oxide, results substantially similar to those shown in the foregoing examples are obtained.

I claim:

1. Method of preparing a synthetic lubricating oil which comprises contacting straight chain alpha olefin of the C₆–C₁₄ range at a temperature in the range of 0–50° C. with a catalyst system formed from (1) an aluminum alkyl sesquichloride, (2) titanium tetrachloride, and (3) an amine oxide selected from the group consisting of tertiary amine N-oxides and aromatic amine N-oxides wherein the nitrogen atom is a member of an aromatic ring, the amounts of said aluminum alkyl sesquichloride and titanium tetrachloride being such that the atomic ratio of Al to Ti is in the range of 0.8–2.5 and the amount of said amine oxide being such that the atomic ratio of O to Al is in the range of 0.2–0.6, and thereafter separating from the reaction mixture olefin polymer of lubricating oil boiling range.

2. Method according to claim 1 wherein the Al to Ti ratio is in the range of 1.0–1.6.

3. Method according to claim 2 wherein the O to Al ratio is in the range of 0.3–0.55.

4. Method according to claim 1 wherein said oxide is an aromatic amine N-oxide.

5. Method according to claim 4 wherein said oxide is picoline N-oxide.

6. Method according to claim 4 wherein said oxide is pyridine N-oxide.

7. Method according to claim 4 wherein the Al to Ti ratio is in the range of 1.0–1.6.

8. Method according to claim 1 wherein said oxide is a tertiary amine N-oxide.

9. Method according to claim 8 wherein the Al to Ti ratio is in the range of 1.0–1.6.

10. Method according to claim 1 wherein said temperature is in the range of 10–40° C.

11. Method of preparing a synthetic lubricating oil which comprises contacting straight chain alpha olefin of the $C_6$–$C_{14}$ range at a temperature in the range of 10–40° C. with a catalyst system formed from an aluminum alkyl sesquichloride, titanium tetrachloride and an amine oxide selected from the group consisting of tertiary amine N-oxides and aromatic amine N-oxides wherein the nitrogen atom is a member of an aromatic ring, the amounts of the aluminum alkyl sesquichloride and titanium tetrachloride being such that the atomic ratio of Al to Ti is in the range of 1.0–1.6 and the amount of said amine oxide being such that the atomic ratio of O to Al is in the range of 0.2–0.6, and thereafter separating from the reaction mixture olefin polymer of lubricating oil boiling range.

12. Method according to claim 11 wherein said oxide is an aromatic amine N-oxide.

13. Method according to claim 12 wherein said oxide is picoline N-oxide.

14. Method according to claim 12 wherein said oxide is pyridine N-oxide.

15. Method according to claim 12 wherein said sesquichloride is aluminum ethyl sesquichloride.

16. Method according to claim 11 wherein said oxide is a tertiary amine N-oxide.

17. Method according to claim 16 wherein said sesquichloride is aluminum ethyl sesquichloride.

References Cited by the Examiner
UNITED STATES PATENTS

| | | | |
|---|---|---|---|
| 2,993,942 | 7/1961 | White et al. | 260—683.15 |
| 3,108,145 | 10/1963 | Antonsen | 260—683.15 |
| 3,179,711 | 4/1965 | Antonsen | 260—683.15 |

DELBERT E. GANTZ, *Primary Examiner.*

R. H. SHUBERT, *Assistant Examiner.*